(12) United States Patent
Wilson (10) Patent No.: US 8,362,387 B2
(45) Date of Patent: Jan. 29, 2013

(54) ELECTRODE FOR PLASMA ARC TORCH AND RELATED PLASMA ARC TORCH

(75) Inventor: Jesse M. Wilson, Hanahan, SC (US)

(73) Assignee: Kaliburn, Inc., Ladson, SC (US)

( * ) Notice: Subject to any disclaimer, the term of this patent is extended or adjusted under 35 U.S.C. 154(b) by 68 days.

(21) Appl. No.: 12/959,904

(22) Filed: Dec. 3, 2010

(65) Prior Publication Data
US 2012/0138578 A1 Jun. 7, 2012

(51) Int. Cl.
*B23K 10/00* (2006.01)

(52) U.S. Cl. ........... 219/121.5; 219/121.52; 219/121.57; 315/111.21

(58) Field of Classification Search ............. 219/121.48, 219/121.5, 121.52, 121.57, 74, 75; 315/111.21; 313/231.41, 231.51
See application file for complete search history.

(56) References Cited

U.S. PATENT DOCUMENTS

| | | | |
|---|---|---|---|
| 4,782,210 A * | 11/1988 | Nelson et al. ............ | 219/121.52 |
| 5,083,005 A | 1/1992 | Degrigny | |
| 5,164,569 A | 11/1992 | Porra et al. | |
| 5,451,739 A | 9/1995 | Nemchinsky et al. | |
| 5,601,734 A | 2/1997 | Luo et al. | |
| 5,726,414 A * | 3/1998 | Kitahashi et al. ........ | 219/121.48 |
| 5,951,888 A | 9/1999 | Oakley | |
| 6,011,238 A | 1/2000 | Bertez et al. | |
| 6,066,827 A | 5/2000 | Nemchinsky | |
| 6,933,461 B2 | 8/2005 | Horner-Richardson et al. | |
| 6,936,786 B2 | 8/2005 | Hewett et al. | |
| 7,375,303 B2 | 5/2008 | Twarog | |
| 2006/0102598 A1 | 5/2006 | Twarog et al. | |
| 2009/0078686 A1 | 3/2009 | Winn | |

\* cited by examiner

*Primary Examiner* — Mark H Paschall
(74) *Attorney, Agent, or Firm* — Dority & Manning, P.A.

(57) ABSTRACT

Electrodes are disclosed for use in a non-contact initiation plasma arc torch, the electrodes including an electrode body having a distal end opposing the outlet of the nozzle and a tapered section adjacent the distal end configured so that the electrode diameter decreases in the direction of the distal end. The electrode tapered section includes at least one discontinuity forming an edge, the edge being disposed as so to have an included angle of no greater than about 90 degrees. The configuration of the edge provides a localized enhancement of electrical field during non-contact initiation of a pilot arc using the electrode. The discontinuity and edge can be formed in various ways. Related torch designs including nozzles are disclosed.

30 Claims, 7 Drawing Sheets

FIG. 15

ELECTRODE FOR PLASMA ARC TORCH AND RELATED PLASMA ARC TORCH

FIELD OF THE INVENTION

The present invention relates to plasma arc torch electrodes with geometries that assist in initiating a plasma arc, as well as related torches.

BACKGROUND OF THE INVENTION

Plasma cutting tools used to cut or otherwise operate on a workpiece typically comprise a gas nozzle with an electrode therein. Generally, plasma tools direct gas through a nozzle toward the workpiece, with some or all the gas ionized in a plasma arc between the electrode and the workpiece. The arc is used to cut or otherwise operate on the workpiece.

In most tools, a pilot arc is first established between the electrode and the nozzle. Then, the pilot arc is transferred from the nozzle to the workpiece for cutting and/or other operations. For example, some tools use contact-based starting, with the electrode and nozzle initially in contact with one another. While current is passing through the electrode and nozzle, the electrode and nozzle are moved apart to create a gap. A spark across the gap initiates the pilot arc in a successful starting operation.

Other tools use non-contact starting, which can advantageously avoid wear on the electrode that is aggravated by contact during starting and can also avoid the need to have more complexity in terms of additional moving parts to bring the nozzle and electrode into and out of contact. To initiate a plasma arc in a non-contact start, a high electric potential must be generated between the spaced apart nozzle (which acts as the anode) and the electrode (which acts as the cathode). The generated voltage must exceed the break over voltage associated with the air gap between the nozzle and electrode. The break over voltage can be influenced by factors such as distance between nozzle and electrode, type of gas present, velocity of gas flow, and nozzle and electrode geometry. In order to not impede gas flow during use, typical electrodes have flat or tapered shapes at the distal end that cooperate with corresponding shapes of their nozzles. It would be desired, however to have a tip and nozzle combination that provided further improved starting while also not impeding gas flow during use.

SUMMARY OF THE INVENTION

According to certain aspects of the disclosure, electrodes are disclosed for use in a non-contact initiation plasma arc torch, the electrodes including an electrode body having a distal end opposing the outlet of the nozzle and a tapered section adjacent the distal end configured so that the electrode diameter decreases in the direction of the distal end. The electrode tapered section includes at least one discontinuity forming an edge, the edge being disposed so as to have an included angle of no greater than about 90 degrees. The configuration of the edge provides a localized enhancement of electrical field during non-contact initiation of a pilot arc using the electrode. Various options and modifications are possible.

According to certain other aspects of the disclosure, a non-contact initiation plasma arc torch includes a nozzle having a proximal end defining an inlet, a distal end defining an outlet, and a passageway extending from the inlet to the outlet. The passageway includes a tapered section with a diameter decreasing in the direction of the outlet. An electrode extends into the passageway, the electrode having a distal end opposing the outlet of the nozzle and a tapered section adjacent the distal end configured so that the electrode diameter decreases in the direction of the distal end. The electrode tapered section includes at least one discontinuity forming an edge opposing the nozzle tapered section. The edge is disposed so as to have an included angle of no greater than about 90 degrees. The configuration of the edge of the electrode provides a localized enhancement of electrical field during non-contact initiation of a pilot arc. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to an electrode configuration for a plasma arc torch useful in non-contact initiation. The device could include a mechanized torch assembly or a hand-held torch assembly. Various types and sizes of torches are possible at varying voltages if desired. Further, the torches using the disclosed electrodes could be used for marking, cutting or metal removal.

Figure 1:
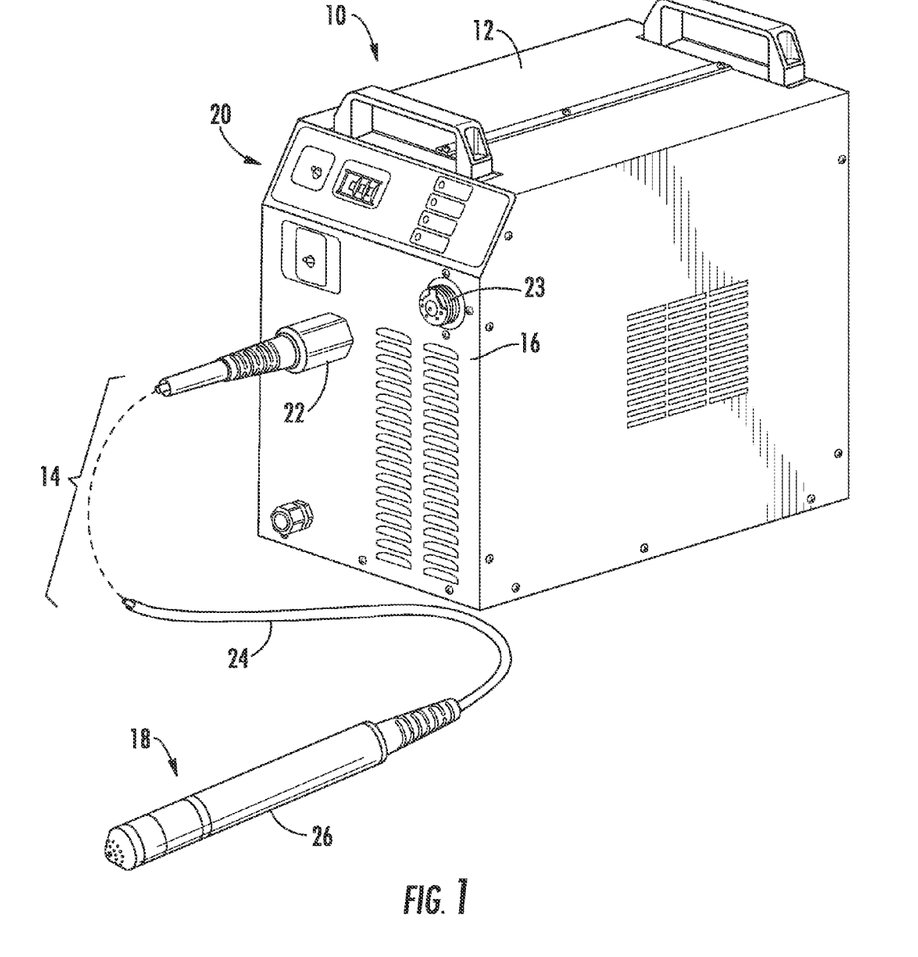
FIG. 1 is a perspective view of one example of a plasma arc torch system according to certain aspects of the disclosure.

FIG. 1 shows one example of such a plasma arc torch device 10. As shown, device 10 includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 14 is attached to a front side 16 of housing. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch body 26 in connection with the relevant portions within housing 12.

Figure 2:
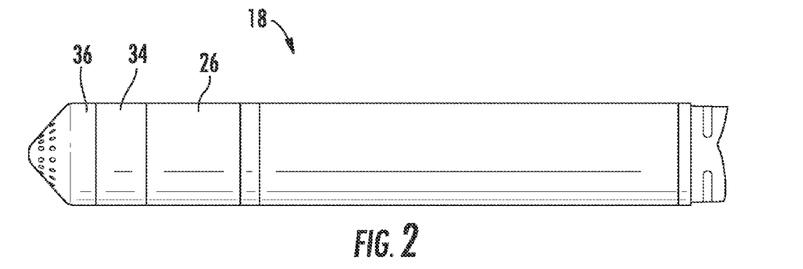
FIG. 2 is a perspective view of the torch portion of the system of FIG. 1.
Figure 3:
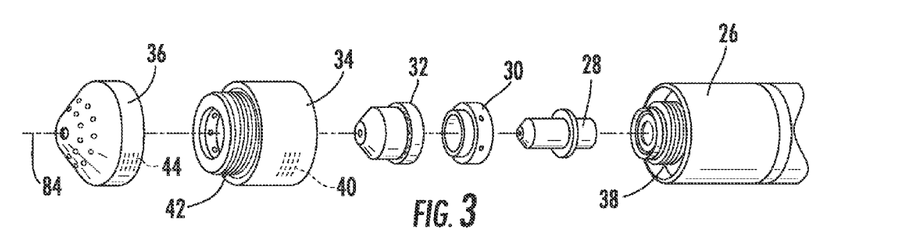
FIG. 3 is an exploded perspective view of the end of the torch portion of FIG. 2 including one possible electrode design.

FIG. 3 shows an exploded view of the end of torch body 26. As shown therein, attached to torch body 26 are electrode 28, swirl ring 30, nozzle 32, retaining cap 34, and shield cap 36. First mating threads 38 and 40 on torch body 26 and retaining cap 34, and second mating threads 42 and 44 on retaining cap 34 and shield cap 36 may be used to hold these pieces together on the end of torch body 26 in the configuration shown in FIG. 2. The sizes, dimensions and arrangements of these elements may be varied somewhat depending on the desired amperage, flow, work to be performed, etc. as is conventional, and additional parts may be employed in some arrangements depending on the application.

Figure 4:
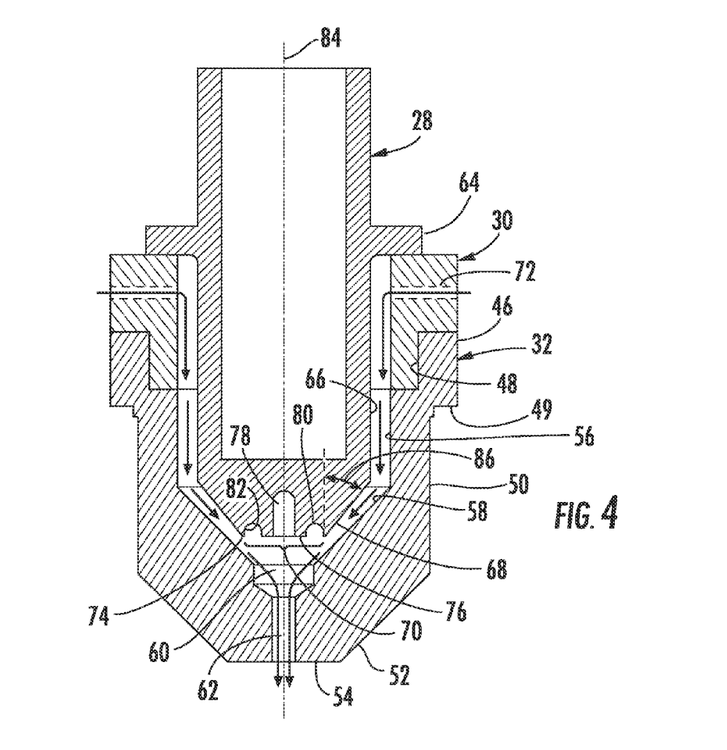
FIG. 4 is a cross-sectional view of the electrode and nozzle portion of the torch of FIG. 2.
Figure 5:
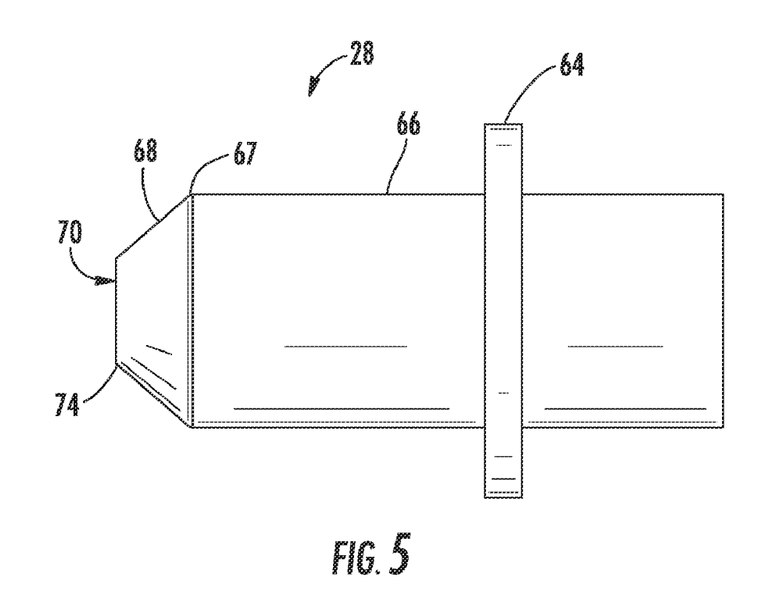
FIG. 5 is a side view of the electrode of FIG. 2.
Figure 6:
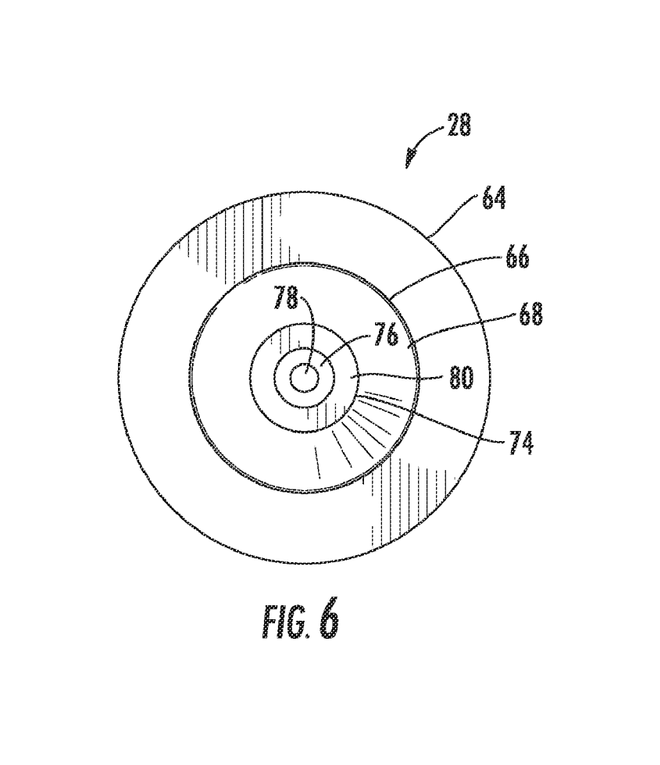
FIG. 6 is an end view of the electrode of FIG. 2.

FIG. 4 shows an enlarged cross section of an electrode 28, swirl ring 30 and nozzle 32 according to certain aspects of the invention. For clarity in FIG. 4, other elements of torch body 26 are not shown. FIGS. 5 and 6 show alternate views of electrode 28.

As shown, nozzle 32 includes an upper annular seating section 46 with an annular inner opening 48 for receiving a portion of swirl ring 30 and an outer annular shoulder 49 for contacting an inner portion of retaining cap 34 (not shown in FIG. 4). Nozzle 32 further includes along its outside a longitudinally extending body portion 50 and a tapered portion 52 ending in a flat tip 54. Within nozzle 32 is defined a passageway including a cylindrical portion 56, a tapered portion 58, a transition area 60 and a reduced diameter outlet passage 62 exiting nozzle 32 via flat tip 54.

Electrode 28 is a substantially cylindrical body. Flange 64 is provided to position electrode 28 for mounting in torch body 26 and to position the electrode relative to swirl ring 30 and nozzle 32 once all are assembled together, and threads (not shown) may be provided to assist in assembly of electrode 28 to torch body 26. A central cylindrical portion 66 of electrode 28 ends at a tapered portion 68, which faces tapered portion 58 of nozzle 32 once assembled together. A distal end face 70 of electrode 28 is located opposite outlet passage 62. A small curved portion 67 may be present between cylindrical portion 66 and tapered portion 68 as a smoothing transition, if desired.

In use, gas flows inwardly through passages 72 within swirl ring 30, down the passageway formed between cylindrical portion 56 of nozzle 32 and cylindrical portion 66 of electrode 28 and the two tapered portions 58 and 68 to and through outlet passage 62. Suitable conventional seal members (not shown) may be provided as desired between torch body 26, electrode 28, swirl ring 30, nozzle 32, retaining cap 34, and/or shield cap 36, etc. to confine gas flow to desired passageways and prevent leakage through interfaces, threaded areas, etc.

End face 70 of electrode 28 has a discontinuous surface. Tapered portion 68 includes a discontinuity, in this case an annular edge 74. In the embodiment as shown in FIG. 4, annular edge 74 is the most distal portion of electrode 28, although it should be understood that the annular edge need not be the most distal portion to achieve some or all of the various benefits of the invention, as disclosed below.

As shown in FIG. 4, radially outwardly and inwardly from annular edge 74, no portion of electrode extends downward toward outlet passage 62 as far as the annular edge. A flat surface 76 is located radially inward of annular edge 74 surrounding a central pit 78. Pit 78 may either be left hollow as shown, or filled with an insert. For example, if electrode 28 is made of copper or a copper alloy, pit 78 may optionally be filled with a form-fitting (press fit) insert of a highly emissive material such as hafnium, zirconium, etc., if desired. Any insert used may either be coplanar with surface 76, or convex or concave in some fashion as well.

Radially outward of flat surface 76 and radially inward of annular edge 74 is an optional annular groove 80. Distally extending from groove 80 is a cylindrical surface 82 extending from the groove to annular edge 74. Therefore, annular edge 74 essentially lies at the intersection of surface 82 and tapered portion 68. Undercut groove 80 is longitudinally spaced from surface 82. Accordingly, with groove 80, annular edge 74 is located atop a longer and sharper extending structure (in this case triangular in cross section) adjacent the annular edge than if flat surface instead extended outwardly to meet cylindrical inner surface 82 without the groove.

Therefore, distally-extended, continuous sharp edge 74 is further accentuated by annular groove 80 in end face 70 of the electrode. Sharp edge 74 is concentric about the central, longitudinal axis 84 of electrode 28, and groove 80 is radially inward of the sharp edge. As shown, no other part of electrode 28 extends distally as far as the sharp edge 74 in this embodiment. Also, annular edge 74 is defined along tapered portion 68 of electrode and opposing tapered portion 58 of nozzle 32.

Having a sharp edge 74 extending in such fashion at the distal end of the electrode, and/or located along the tapered portion 68, intensifies the electrical field at edge 74 during use, which is particularly useful during startup. The disclosed electrode shapes also do not adversely affect gas flow past the electrode during use. This geometry provides more consistent non-contact starting, in particular in conjunction with a unipolar pulse method of starting the torch as set forth in Assignee's co-owned U.S. patent application Ser. No. 11/860,735, filed Sep. 25, 2007, incorporated by reference herein.

With regard to the possible geometry of annular edge 74 with reference to tapered portion 68, annular edge may be located atop structure having an approximate included angle 86 of about 90 degrees or less (in other words, an acute angle up to about a right angle). As shown in FIG. 4, angle 86 is about 40 to about 50 degrees providing a sharp discontinuity. As shown, annular edge 74 may be distally spaced about 0.080 mm from flat surface 76 and about 0.533 mm from the bottom of groove 80, if included. Alternatively, groove 80 may be shallower and flat surface 76 may be spaced further from annular edge 74. Other shapes and configurations are possible as well, either continuous or discontinuous in a circumferential direction.

Nozzle tapered portion 58 may be at the same angle or a different angle than tapered portion 68 with reference to longitudinal axis 82. As shown, tapered portion 68 is at a slightly different angle than tapered portion 58, so that the space between electrode 28 and nozzle 32 decreases slightly in the distal direction (toward outlet passage 62). Groove 80 may be semi-circular in cross section with a depth of approximately 0.453 mm, or other shapes or depths may be employed, or the groove may be eliminated entirely. Annular edge 74 may be uniform around the circumference of electrode 28 as shown, or may vary (for example having continuous or discontinuous circumferential waves, slots, etc.). Therefore, edge 74 need not be fully "annular," as discussed below with reference to other embodiments. Numerous other variations are possible in which a portion of an end face of an electrode extends further distally than a radially inward portion of the end face, and/or where a sharp edge is created on the tapered portion of the electrode opposing the tapered portion of the nozzle for ease in startup, in particular non-contact startup.

A number of variations to the above elements are possible, in particular to electrode 28. In the additional embodiments below, like or similar reference numerals refer to like or similar parts.

Figure 7:
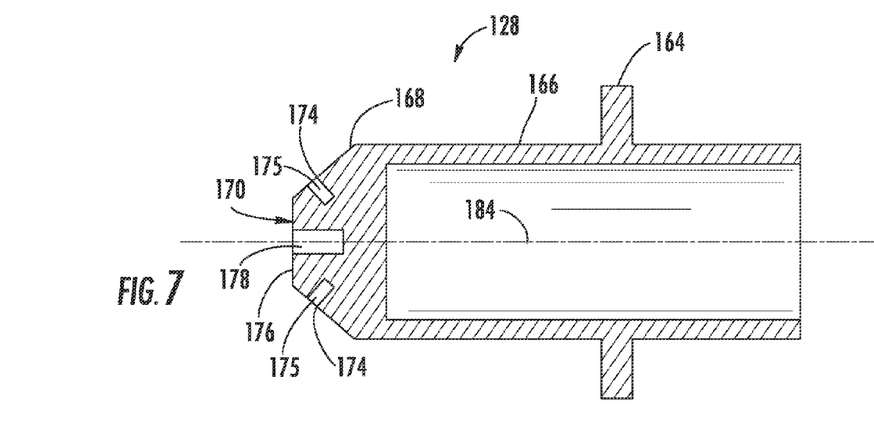
FIG. 7 is a cross-sectional view of another possible electrode design.
Figure 8:
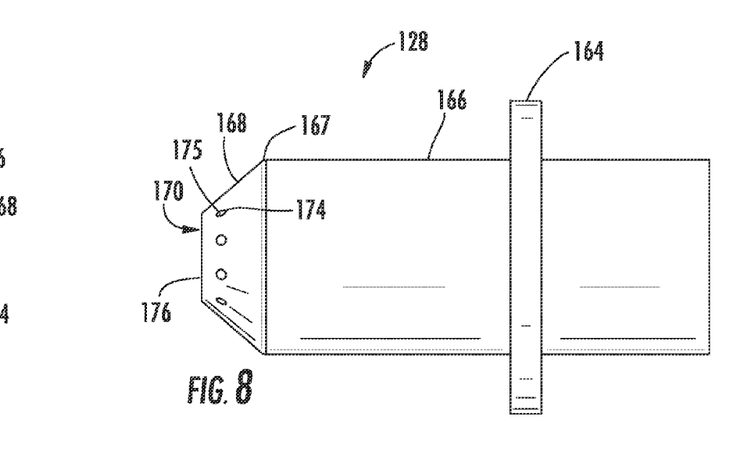
FIG. 8 is a side view of the electrode of FIG. 7.
Figure 9:
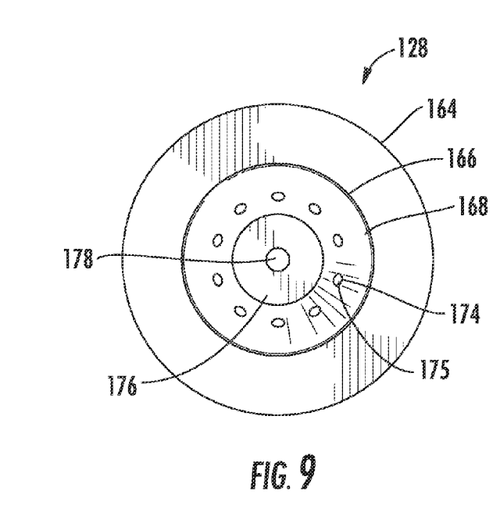
FIG. 9 is an end view of the electrode of FIG. 7.

A second embodiment of an electrode according to certain aspects of the invention is shown in FIGS. 7-9. As shown, electrode 128 is substantially similar to electrode 28 in FIGS. 4-6. However, electrode 128 includes a different discontinuity within tapered portion 168. As shown, at least one opening 175 is formed in a central portion of tapered portion 168 spaced from end face 170. As shown, ten such circular openings 175 are formed, although other numbers and shapes (such as slots, grooves, etc.) could be employed. Edges 174 of openings 175 have an included angle of about 90 degrees in this embodiment, although this could vary. The roughly right angle edge (along a section line as in FIG. 7) provides a discontinuity that assists in non-contact starting. As shown, in this embodiment, edges 174 are not located at the distally furthest point, in contrast with the previous embodiment. Also end face 170 does not have any removed material to form a lowered flat portion (like flat portion 76 above) or a groove (like groove 82 above).

Figure 10:
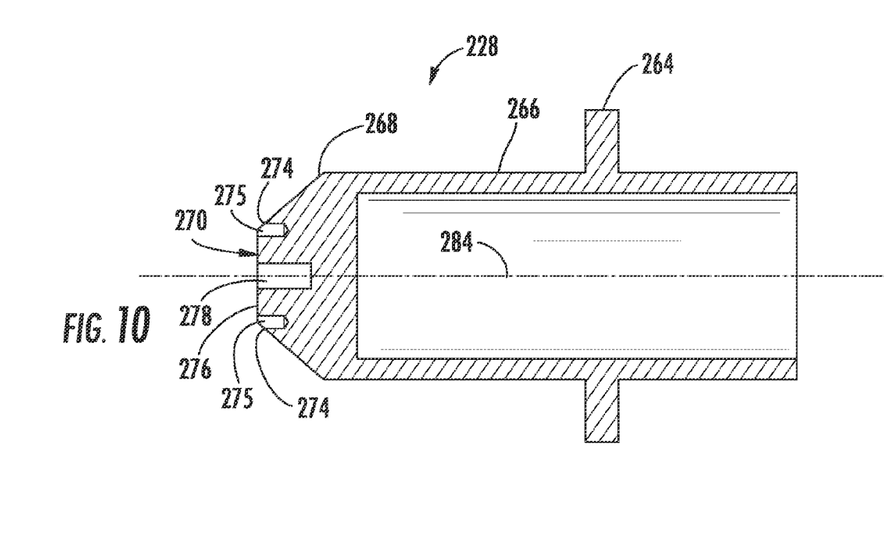
FIG. 10 is a cross-sectional view of a third possible electrode design.
Figure 11:
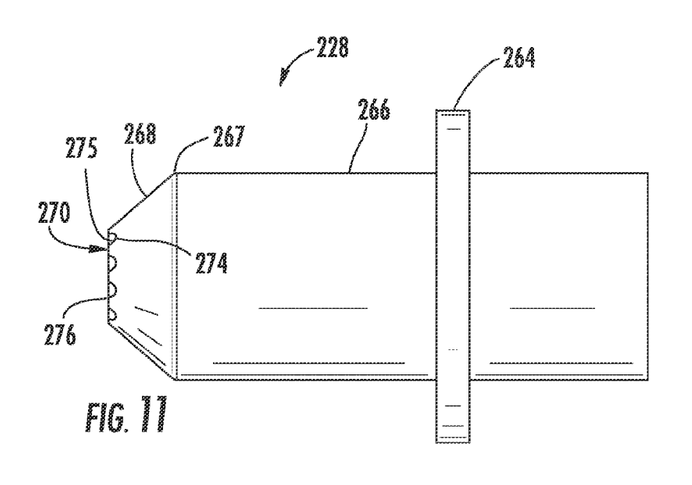
FIG. 11 is a side view of the electrode of FIG. 10.
Figure 12:
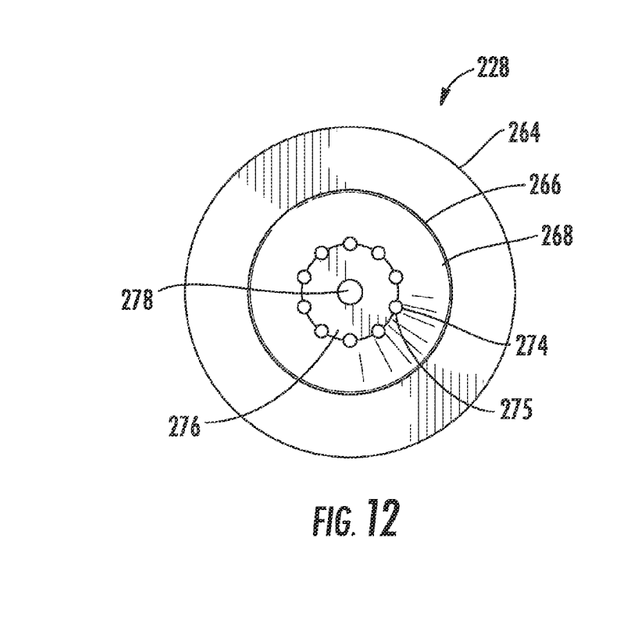
FIG. 12 is an end view of the electrode of FIG. 10.

FIGS. 10-12 show a third embodiment of an electrode 228. As shown, openings 275 are located at the intersection of tapered portion 268 and end face 270. Openings 275 are parallel with longitudinal axis 284 and not roughly perpendicular to the tapered portion, as above in the second embodiment. Such structure allows the included angle near edges 274 to be smaller, in the range of about 40 to about 50 degrees as with the first embodiment. Again edges 274 are not located at the distally furthest point, in contrast with the previous embodiment, and end face 270 does not have any removed material to form a lowered flat portion (like flat portion 76 above) or a groove (like groove 82 above).

Figure 13:
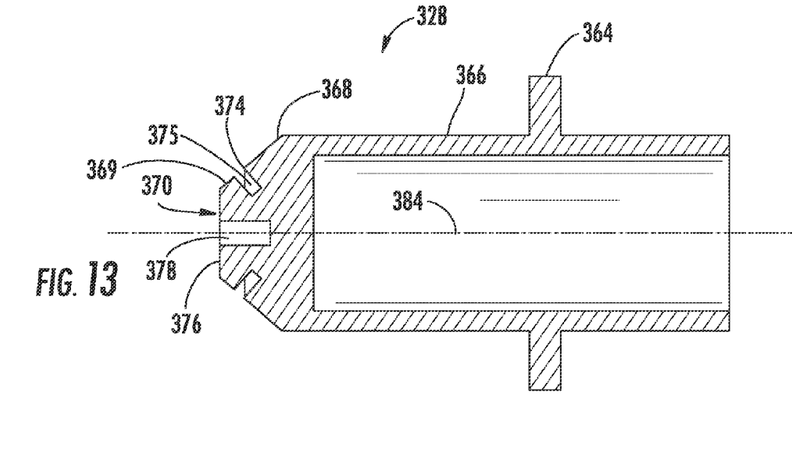
FIG. 13 is a cross-sectional view of a fourth possible electrode design.
Figure 14:
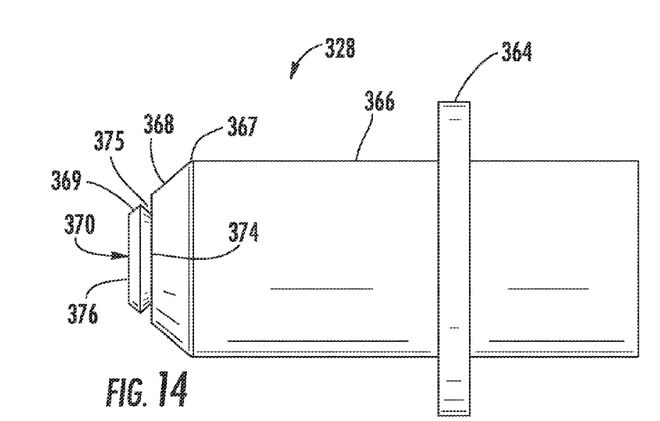
FIG. 14 is a side view of the electrode of FIG. 13.
Figure 15:
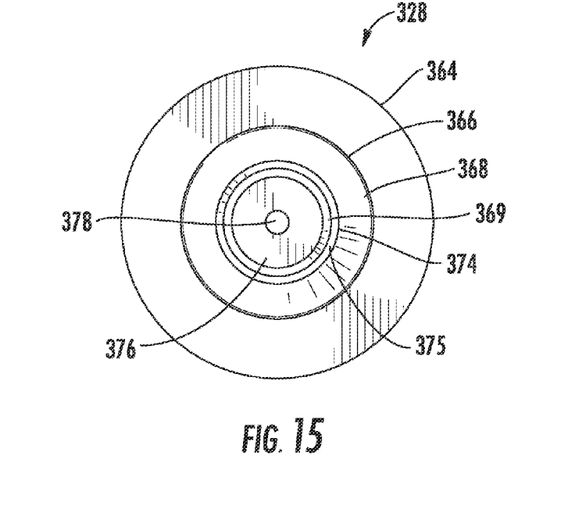
FIG. 15 is an end view of the electrode of FIG. 13.

FIGS. 13-15 show an additional embodiment of an electrode in which edge 374 is formed by a slot 375 extending into and circumferentially around tapered portion 368. A distal part 369 of tapered portion 368 is formed by such slot 375 adjacent end face 370. Slot 375 is substantially perpendicular to tapered portion 368 (in section), although other angles could be employed, such as parallel to longitudinal axis 384.

Figure 16:
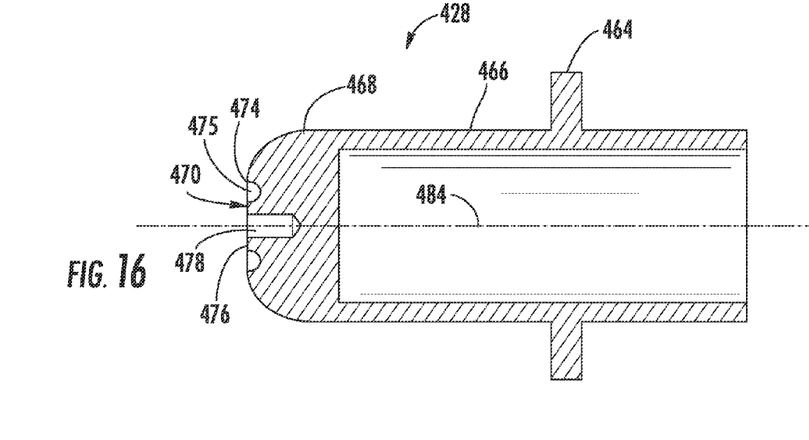
FIG. 16 is a cross-sectional view of a fifth possible electrode design.
Figure 17:
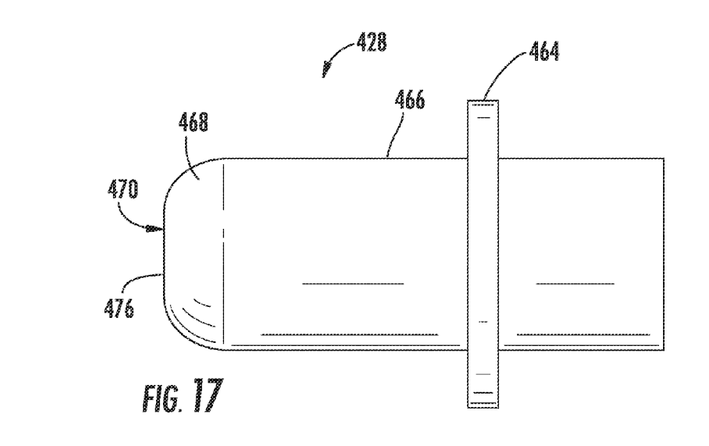
FIG. 17 is a side view of the electrode of FIG. 16.
Figure 18:
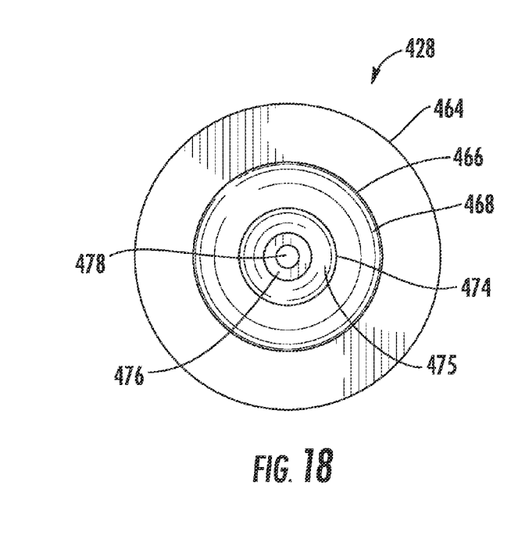
FIG. 18 is an end view of the electrode of FIG. 16.

FIGS. 16-18 show a fifth embodiment of an electrode 428 with a differing (curved) tapered portion 468. As shown, tapered portion 468 is not conical (with a uniform taper in the distal direction, as above). Instead, tapered portion 468 is curved (with a non-uniform taper in the distal direction). Groove 475 formed in electrode 428 defines edge 474 and surrounds flat portion 476 of end face 470. Groove 475 could be replaced by holes, full or partial slots at varying angles as above. The included angle at edge 474 is up to about 90 degrees.

Features of each of the disclosed electrodes 28, 128, 228, 328 and 428 can be combined and modified in various ways to achieve electrode and torch designs useful for achieving one or more benefits of the disclosure. For example, openings can be arranged in single rows, multiple rows with varying sizes and shapes to achieve better starting. Sharp edges may be at the most distal point of the electrodes or along any part of the differing tapered portions. Multiple sharp edges may be present circumferentially or longitudinally along the tapered portions. Use of such edges in electrodes can in some circumstances substantially drop the amount of voltage required for non-contact starting. For example, a device initiating a pilot current at with an applied voltage in the range of 8 kv may be able to start with a voltage at a substantially lower amount, such as perhaps 4-5 kv. Allowing breakover to occur at a substantially lower voltage provides numerous benefits in terms of cost and safety.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A non-contact initiation plasma arc torch comprising:
a nozzle having a proximal end defining an inlet, a distal end defining an outlet, and a passageway extending from the inlet to the outlet, the passageway including a tapered section with a diameter decreasing in the direction of the outlet; and
an electrode extending into the passageway, the electrode having a unitary body including a distal end opposing the outlet of the nozzle, the electrode having a tapered section terminating at the distal end configured so that the electrode diameter decreases in the direction of the distal end, the electrode tapered section including at least one discontinuity forming an edge opposing the nozzle tapered section, the edge being disposed so as to have an included angle of no greater than about 90 degrees, the configuration of the edge of the electrode providing a localized enhancement of electrical field during non-contact initiation of a pilot arc.

2. The torch of claim 1, wherein the edge comprises an annular edge extending circumferentially around the tapered section of the electrode.

3. The torch of claim 2, wherein the edge is circumferentially continuous.

4. The torch of claim 2, wherein the edge is circumferentially discontinuous.

5. The torch of claim 1, wherein the edge is formed by at least one hole formed in the tapered section of the electrode.

6. The torch of claim 1, wherein the edge is formed by at least one groove formed in the tapered section of the electrode.

7. The torch of claim 1, wherein the edge forms the most distal portion of the electrode, the portion of the distal end located radially inward of the edge being spaced proximally from the edge.

8. The torch of claim 7, wherein the edge comprises an annular edge extending circumferentially around the tapered section of the electrode.

9. The torch of claim 8, wherein the electrode distal end defines an annular groove radially inward from the annular edge.

10. The torch of claim 9, wherein the electrode distal end defines a flat surface radially inward of the annular groove.

11. The torch of claim 9, wherein the annular edge extends distally about 0.5 mm further than the base of the annular groove.

12. The torch of claim 8, wherein the annular edge extends distally about 0.08 mm further than the flat surface.

13. The torch of claim 1, wherein the edge defines an included angle of about 40 to about 50 degrees.

14. The torch of claim 1, wherein the tapered section of the electrode has a conical configuration with a uniform taper in the distal direction.

15. The torch of claim 1, wherein the tapered section of the electrode has a curved configuration with a non-uniform taper in the distal direction.

16. An electrode for use in a non-contact initiation plasma arc torch, the electrode comprising:

an electrode body having a unitary body including a distal end opposing the outlet of the nozzle, a tapered section terminating at the distal end configured so that the electrode diameter decreases in the direction of the distal end, the electrode tapered section including at least one discontinuity forming an edge, the edge being disposed so as to have an included angle of no greater than about 90 degrees, the configuration of the edge providing a localized enhancement of electrical field during non-contact initiation of a pilot arc using the electrode.

17. The electrode of claim 16, wherein the edge comprises an annular edge extending circumferentially around the tapered section of the electrode body.

18. The electrode of claim 17, wherein the edge is circumferentially continuous.

19. The electrode of claim 17, wherein the edge is circumferentially discontinuous.

20. The electrode of claim 16, wherein the edge is formed by at least one hole formed in the tapered section.

21. The electrode of claim 16, wherein the edge is formed by at least one groove formed in the tapered section.

22. The electrode of claim 16, wherein the edge forms the most distal portion of the electrode body, the portion of the distal end located radially inward of the edge being spaced proximally from the edge.

23. The electrode of claim 22, wherein the edge comprises an annular edge extending circumferentially around the tapered section.

24. The electrode of claim 23, wherein the distal end defines an annular groove radially inward from the annular edge.

25. The electrode of claim 24, wherein the distal end defines a flat surface radially inward of the annular groove.

26. The electrode of claim 24, wherein the annular edge extends distally about 0.5 mm further than the base of the annular groove.

27. The electrode of claim 23, wherein the annular edge extends distally about 0.08 mm further than the flat surface.

28. The electrode of claim 16, wherein the edge defines an included angle of about 40 to about 50 degrees.

29. The electrode of claim 16, wherein the tapered section has a conical configuration with a uniform taper in the distal direction.

30. The electrode of claim 16, wherein the tapered section has a curved configuration with a non-uniform taper in the distal direction.

* * * * *